(12) United States Patent
Kubiak

(10) Patent No.: US 6,851,742 B1
(45) Date of Patent: Feb. 8, 2005

(54) CAST ALLOY INSTRUMENT PANEL BEAMS

(75) Inventor: Robert R. Kubiak, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/752,133

(22) Filed: Jan. 6, 2004

(51) Int. Cl.[7] .............................................. B62D 25/14
(52) U.S. Cl. ........................... 296/193.02; 296/203.02; 296/70
(58) Field of Search ....................... 296/187.09, 193.09, 296/203.01, 205, 70, 203.02, 193.02

(56) References Cited

U.S. PATENT DOCUMENTS

| 5,931,520 | A | * | 8/1999 | Seksaria et al. | 296/70 |
| 6,176,544 | B1 | * | 1/2001 | Seksaria et al. | 296/203.02 |
| 6,391,470 | B1 | * | 5/2002 | Schmieder et al. | 428/598 |
| 6,394,527 | B2 | * | 5/2002 | Ohno et al. | 296/72 |
| 6,554,352 | B2 | * | 4/2003 | Nagy | 296/70 |
| 6,685,259 | B1 | * | 2/2004 | Shimase et al. | 296/70 |
| 2003/0034672 | A1 | * | 2/2003 | Nagy | 296/203.02 |
| 2004/0041432 | A1 | * | 3/2004 | Baker et al. | 296/70 |
| 2004/0108744 | A1 | * | 6/2004 | Scheib et al. | 296/70 |

* cited by examiner

Primary Examiner—Jason Morrow
(74) Attorney, Agent, or Firm—Laura C. Hargitt

(57) ABSTRACT

A beam cast of an Al—Mg alloy is used for mounting various automotive vehicle components adjacent to a cowl/plenum structure at the forward end of a passenger compartment of an automotive vehicle. The beam includes a laterally extending main beam portion attached at the ends thereof to the driver side and passenger side front pillars. A plurality of spaced strap portions, cast unitary with the laterally extending main beam portion, extend forward from the main beam portion for attachment to the cowl/plenum structure. A pair of vertical strut portions, also cast unitary with the main beam portion, have a space therebetween for accommodating HVAC components. The pair of substantially vertical strut portions have lower ends adapted to attach to vertical steel struts that anchor the lower ends of the substantially vertical strut portions to a floor brace. The substantially vertical strut portions cooperate with the strap portions to dampen frequency response in the main beam portion of the cast Al—Mg alloy beam arrangement.

12 Claims, 5 Drawing Sheets

CAST ALLOY INSTRUMENT PANEL BEAMS

FIELD OF THE INVENTION

The present invention is directed to cast alloy instrument panel beams. More particularly, the present invention is directed to instrument panel beams cast of an aluminum-magnesium alloy to provide structural frame members that support components proximate to and within passenger compartments of automotive vehicles.

BACKGROUND OF THE INVENTION

Many instrument panel beams are configured as formed tubular steel structures having depending struts extending transversely therefrom, as well as extending from auxiliary structures attached to the formed tubular steel structures. Steel structures tend to be relatively heavy, so in order to reduce vehicle weight in order to enhance fuel consumption, some instrument panel beams are currently being cast from aluminum-magnesium (Al—Mg) alloys that weigh substantially less than steel beams. Since Al—Mg alloys are more expensive than steel, there is a need to take advantage of weight savings provided by cast Al—Mg beams, while reducing the cost thereof by optimizing Al—Mg mass. Moreover, there is a need to provide an Al—Mg instrument panel beam that is compatible with existing automotive body and frame configurations in a way that the weight advantages of Al—Mg alloy castings can be conveniently employed in existing vehicle designs.

SUMMARY OF THE INVENTION

The present invention is directed to a beam of cast aluminum-magnesium (Al—Mg) alloy used in a vehicle for mounting automotive components adjacent to a cowl/plenum structure at a forward end of the vehicle's passenger compartment. The beam comprises a laterally extending, main beam portion of Al—Mg alloy having a first end for fastening directly to a driver side front pillar of the vehicle and a second end for fastening directly to a passenger side front pillar of the vehicle. Spaced strap portions, cast of Al—Mg alloy, are unitary with the main beam portion and extend forward from the main beam portion for attachment to the cowl/plenum structure. A pair of vertical strut portions, cast of Al—Mg alloy and unitary with the main beam portion, have a space therebetween for accommodating HVAC components, and also have lower ends adapted to attach to vertical steel struts in order to anchor the lower ends of the strut portions to a floor brace. The vertical strut portions cooperate with the strap portions to dampen frequency response within the main beam portion.

In accordance with one aspect of the invention, the aforedescribed laterally extending main beam portion has first, second, third and fourth sections. The first section extends from the first end of the main beam portion to a location from which a first strap portion depends, while a second section extends between the first strap portion and second strap portion, the second portion having flanges thereon for supporting a steering column. The third section extends between the second strap portion and a third strap portion with the vertical strut portions extending downwardly from the third section. The third section also has an opening therethrough for accommodating an HVAC module and/or an audio unit. The fourth section extends from the third strap portion to the second end of the beam and is adapted to accommodate a passenger air bag support bracket thereabove.

In another aspect of the invention, the beam has a front side adapted to face forward away from the passenger cabin, and a rear side adapted to face rearwardly toward the passenger compartment. The front side has an array of cast cross braces within a cavity in the front side.

In still further, multiple independent aspects of the invention, the vertical strut portions have rearwardly opening cavities having cast cross braces therein; the third section has a panel portion extending downwardly therefrom with the vertical strut portions depending downwardly from the panel portion; the first section of the beam extends obliquely from the second section in a direction toward the passenger cabin; the fourth section of the beam has a top surface that extends at a level below the first, second and third sections, and the first and second ends of the beam include flanges having bolt holes therethrough adapted to receive bolts for securing the beam to the side pillars.

In still a further aspect of the invention, a passenger compartment of a vehicle includes the aforedescribed beam and aforedescribed aspects of the beam in combination therewith to provide structural rigidity and vibration reduction, as well as providing mounting sites for automotive components that are interactive with passengers in the passenger compartment. These sites are located on planes that are cast into the main section of the beam.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
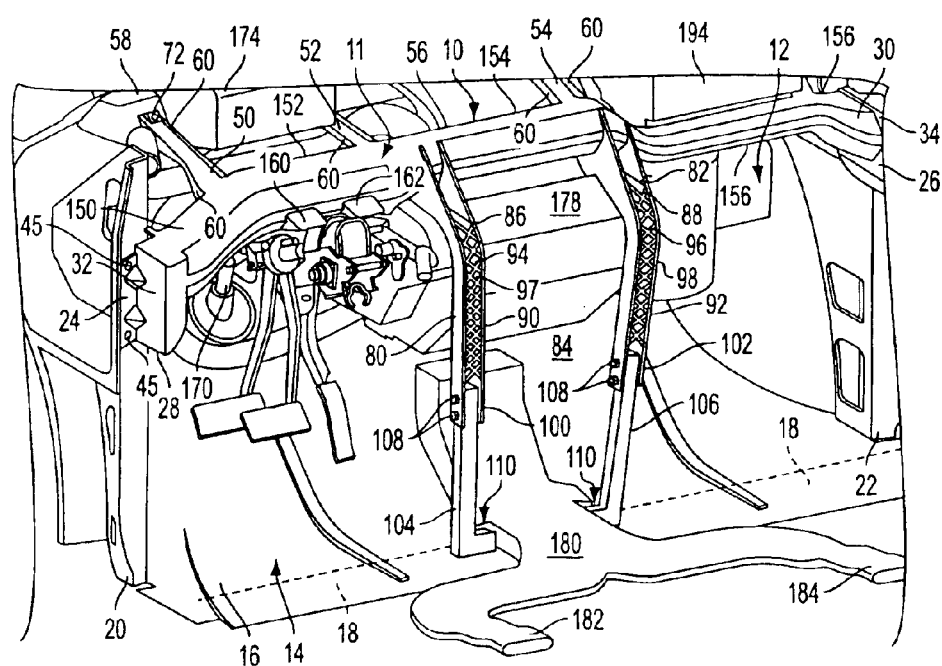
FIG. 1 is a perspective view showing a cast beam, configured in accordance with the principles of the present invention and shown in association with automotive components at the front end of a vehicular passenger compartment.

Referring now mainly to FIG. 1, a cast instrument panel beam 10 with a main beam portion 11 laterally extends across, and is installed, at the forward end 12 of a passenger compartment 14 of an automotive vehicle. The passenger compartment 14 has a floor 16 under which a floor brace 18 (dotted lines) is fixed, the floor brace 18 being a component of the automotive vehicle's frame. A driver side pillar 20 and a passenger side pillar 22 are disposed on opposite sides of the passenger compartment 14 and have upper end portions 24 and 26, respectively, to which first and second ends 28 and 30 of the main beam portion 11 are attached.

Referring now mainly to FIGS. 2–5, the main beam portion 11, commonly known as a "cast magnesium beam", is in reality a beam cast of aluminum-magnesium (Al—Mg) alloy having ASTM designations such as AM60 or AM50. These alloys have desirable shock absorption features and high ductility. While other Al—Mg alloys can be used, the preferable Al—Mg alloy for the main beam portion 11 is AM60. A first flange 32 is located at the first end 28 of the main beam portion 11 of the beam 10 and a second flange 34 is located at the second end 30 of the main beam portion. The flange 32 has a pair of bolt holes 36 and 38 while a flange 34 has a pair of bolt holes 40 and 42. The holes receive bolts 45 which extend in a horizontal direction to bolt the flanges 32 and 34 to upper end portions 24 and 26 of the side pillars 20 and 22. Vertical bolts may pass through vertically oriented bolt holes 46 and 47 in flanges 48 and 49 at the ends 28 and 30 of the cast beam 10 to provide further anchoring of the ends to side pillars similar to the side pillars 24 and 26.

Figure 2:
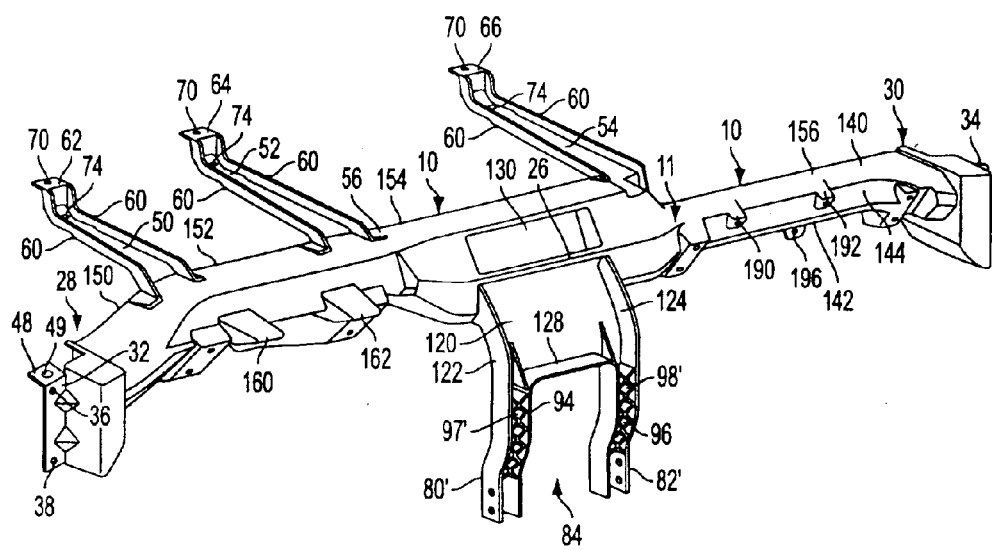
FIG. 2 is a perspective view showing in isolation the rear side of a cast beam similar to that shown in FIG. 1.
Figure 3:
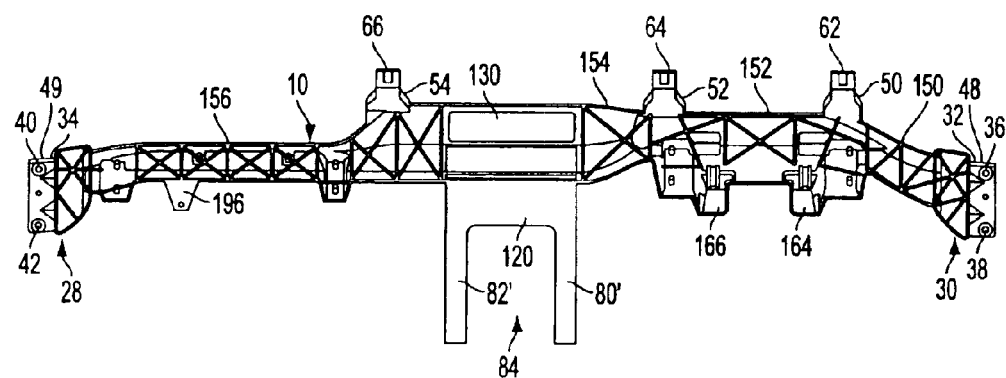
FIG. 3 is a planar view of the front of the cast beam of FIG. 2.
Figure 4:
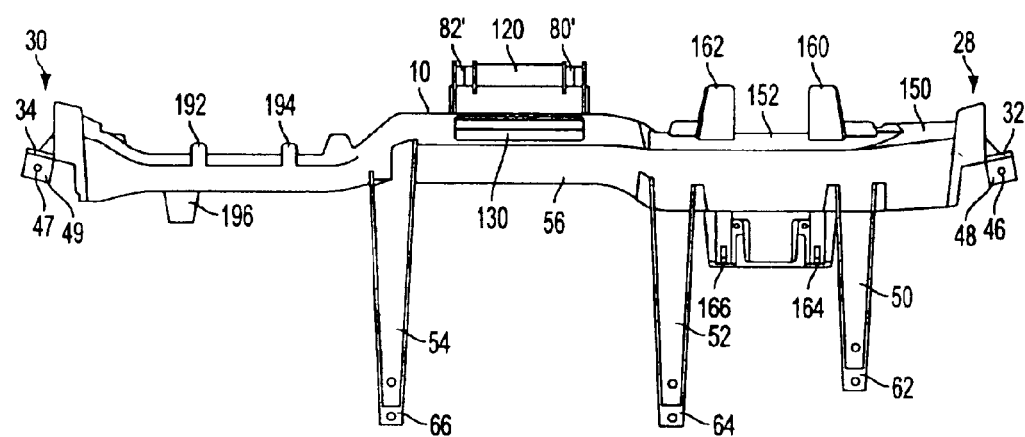
FIG. 4 is a top view of the cast beam of FIGS. 2 and 3.
Figure 5:
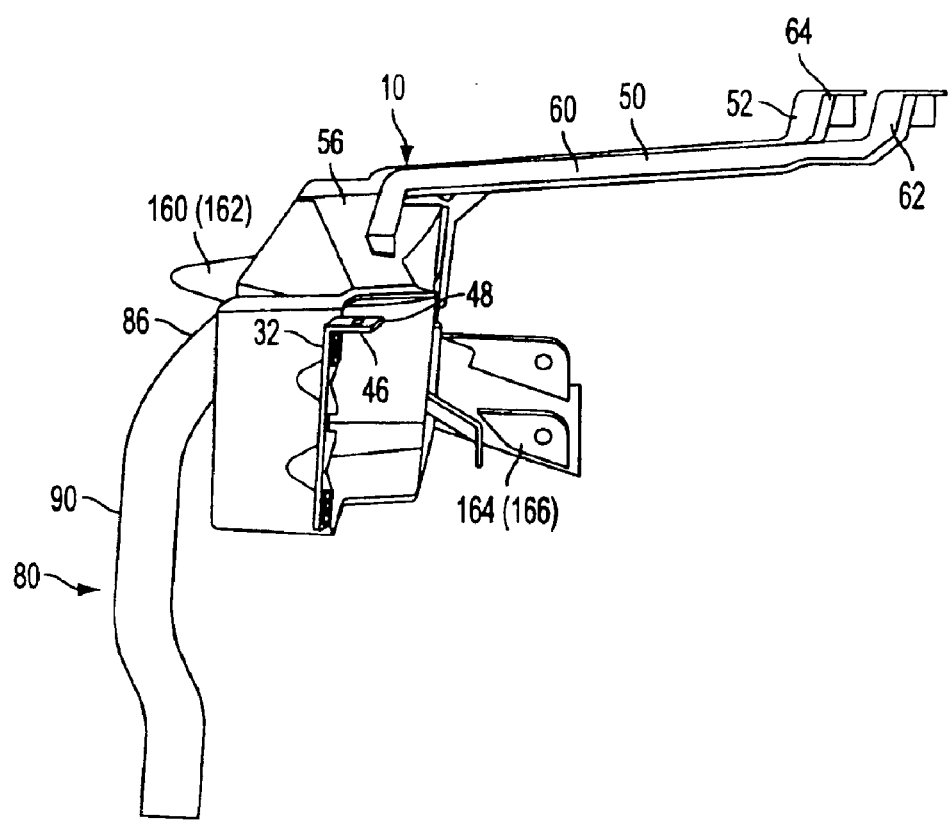
FIG. 5 is a side view of the cast beam of FIGS. 2–4.

First, second and third horizontally extending straps 50, 52 and 54 extend forwardly from the top surface 56 of the cast main beam portion 11 toward a cowl 58 (FIG. 1) positioned in front of the passenger compartment 14. The straps 50, 52 and 54 are preferably cast unitarily with the beam 10, and as best seen in FIGS. 2 and 5, include upwardly extending stiffening flanges 60 along side edges thereof. The straps 50, 52 and 54 also include L-shaped end portions 62, 64 and 66, each of which have a bolt hole 70 therethrough with a bolt 72 for fastening the straps to the cowl 58. Preferably, each of the straps 52, 54 and 56 includes a second bolt hole 74 for receiving an additional bolt proximate the L-shaped end portions 62, 64 and 66.

Projecting inwardly toward the passenger compartment 14 and downwardly toward the floor 16 of the passenger compartment are a pair of vertically extending struts 80 and 82 separated by a space 84. The struts 80 and 82 are preferably cast unitarily with the beam 10 and are therefore cast of Al—Mg alloy. The struts 80 and 82 have first portions 86 and 88, respectively, which extend obliquely with respect to the beam 10 and join portions 90 and 92 which extend more vertically. As is seen in FIGS. 1 and 2, cavities 94 and 96 are cast in the struts 80 and 82, which cavities contain cross bracing 97 and 98, respectively.

As is seen in FIG. 1, the lower ends 100 and 102 of the struts 80 and 82, steel strut extensions 104 and 106 are connected thereto by pairs of bolts 108. The steel strut extensions 104 and 106 are anchored to the floor brace 18 located beneath the floor 16 of the passenger compartment 14 by bolts.

In FIGS. 2–5 a preferred embodiment of the invention is shown wherein the vertical struts 80' and 82' depend from a panel 120 which extends between upper portions 122 and 124 of the struts 80' and 82'. The upper portions 122 and 124 form side flanges for the panel 120, and with top and bottom flanges 126 and 128, stiffen the panel. In the illustrated embodiment of FIGS. 2–5, the panel 120 has a slight convexity thereto with respect to the passenger compartment 14. Above the flange 126 on the panel 120, an opening 130 is provided through which HVAC air is delivered from the HVAC module to the instrument panel duct system.

The main beam portion 11 of the cast beam 10 is arranged to support several automotive components, such as but not limited to, an instrument panel carrier, an audio system, an HVAC system, a passenger side air bag, a glove compartment and a steering column, as well as to accommodate floor structures such as tunnel portions (not shown) of the floor 16 and ducts for the HVAC system. This is accomplished by independent planes, such as planes 140, 142 and 144 of FIG. 2 on the perimeter of the cast beam 10 that create mounting planes for various insulary brackets and accommodate devices that are fastened to the cast beam or positioned adjacent to the cast beam.

The cast beam 10 is divided into four sections 150, 152, 154 and 156 by the straps 50, 52 and 54. The first section 150 anchors the first end 28 of the main beam portion 11 to the pillar 20 with the flange 32 and extends obliquely from the main beam portion toward the front 12 of the passenger compartment 14. The second section 152 has supports 160 and 162 which extend rearwardly into the passenger compartment for supporting a steering column(not shown). The second section also has a pair of forwardly projecting brackets 164 and 166 which project forwardly toward the cowl 58 in FIG. 1 and support the steering column 170 that extends beneath the cast beam 10 (see FIG. 1).

Between the second strap 52 and the third strap 54, the second section 154 of the beam 10 includes an opening 130 for the HVAC air delivery system (not shown) and defines the space 84 which accommodates the HVAC module 178 (FIG. 1). In the embodiment of FIGS. 2–5, the HVAC system 178 is disposed behind the panel 120. As is seen in FIG. 1, between the steel struts 104 and 106 attached to the cast vertical struts 80' and 82', a duct 180 is positioned for conveying air from the HVAC system 178 toward the rear of the passenger compartment 14 via a pair of duct extensions 182 and 184. The space 84 between the steel struts 104 and 106 can also accommodate tunnel structures (not shown) in the floor 16.

To the right of the strap 54 when looking forward as in FIGS. 1 and 2, the fourth section 156 of the beam 10 includes passenger air bag module mounting pads 190 and 192 which support an air bag module 194. Depending downwardly from the section 156 is a bracket 196 which helps support the instrument panel trim (not shown) of the vehicle.

The main beam portion 11 of the cast beam serves a primary purpose of carrying the mass of all cockpit module components and providing cross-car vehicle structure. Since the main beam portion 11 is cast of an Al—Mg alloy such as AM60, the beam helps reduce vibration that can occur over time in the HVAC and audio systems components by having frequency response characteristics with a first mode response of 35 Hz. Moreover, the packaging envelope provided by the aforedescribed cast beam structure 10 mimics the physical size and configuration of a formed tubular steel arrangement. Consequently, the aforedescribed cast beam arrangement provides an ability to "toggle" between tubular steel and cast aluminum-magnesium castings using nearly identical packaging configurations.

From the foregoing description, one skilled in the art can easily ascertain the essential characteristics of this invention, and without departing form the spirit and scope thereof, can make various changes and modifications of the invention to adapt it to various usages and conditions.

What is claimed is:

1. A beam cast of aluminum-magnesium (Al—Mg) alloy for mounting components adjacent to a cowl/plenum structure at the forward end of a passenger compartment in an automotive vehicle, the beam comprising:

a laterally extending main beam portion of Al—Mg alloy having a first end for fastening directly to a driver side front pillar of the vehicle and a second end for fastening directly to a passenger side front pillar of the vehicle;

a plurality of spaced strap portions cast of Al—Mg alloy unitarily with the main beam portion, the strap portions extending forward from the main beam portion for attachment to the cowl/plenum structure of the automotive vehicle, and a pair of substantially vertical strut portions cast of Al—Mg alloy unitarily with the main beam portion, the substantially vertical strut portions having a space therebetween for accommodating HVAC components and having lower ends adapted to attach to vertical steel struts to anchor the lower ends of the strut portions to a floor brace.

2. The beam of claim 1 wherein the main beam portion has first, second, third and fourth sections;

the first section extending from the first end of the main beam portion to a location from which a first strap portion extends;

the second section extending between the first strap portion and a second strap portion, the second portion having flanges thereon for supporting a steering column;

the third section extending from the second strap portion to a third strap portion, the third section having an opening for receiving HVAC module therethrough with the vertical strut portions extending downwardly therefrom, and the fourth section extending from the third strap portion to the second end of the main beam portion, the fourth section adapted to accommodate a passenger air bag mounting bracket thereabove and an instrument panel trim support therebelow.

3. The beam of claim 2 wherein the first section of the beam extends obliquely from the second section in a direction toward the cowl/plenum structure.

4. The beam of claim 1 wherein the main beam portion has a front side adapted to face forward away from the passenger cabin and a rear side adapted is to face rearward toward the passenger compartment, the front side having an array of cast cross braces within a cavity in the front side.

5. The beam of claim 1 wherein the vertical strut portions each have a rearwardly opening cavity with cast cross braces in the rearwardly facing cavities.

6. The beam of claim 2 wherein the third section has a panel portion extending downwardly therefrom with the vertical strut portions depending downwardly from the panel portion.

7. The beam of claim 2 wherein the fourth section of the beam has a top surface which extends at a level below the first, second and third sections.

8. The beam of claim 1 wherein the first and second ends include flanges having bolt holes therethrough adapted to receive bolts for securing the beam to the side pillars.

9. The beam of claim 1 wherein the strap portions have vertically offset end tabs with bolt holes therethrough for attaching the beam to the cowl/plenum structure of the automotive vehicle.

10. A passenger compartment of an automotive vehicle, including a beam cast of aluminum-magnesium (Al—Mg) alloy for mounting components adjacent to a cowl/plenum structure at the forward end of the passenger compartment, the beam comprising:

a laterally extending main beam portion of Al—Mg alloy having a first end for fastening directly to a driver side front pillar of the passenger compartment and a second end for fastening directly to a passenger side front pillar of the passenger compartment;

a plurality of spaced strap portions cast of Al—Mg alloy unitary with the main beam portion, the strap portions extending forward from the main beam portion for attachment to the cowl/plenum structure of the automotive vehicle, and a pair of vertical strut portions cast of Al—Mg alloy unitary with the main beam portion, the vertical strut portions having a space therebetween for accommodating HVAC components and having lower ends attached to vertical steel struts to anchor in the passenger compartment the lower ends of the strut portions to a floor brace, the vertical strut portions cooperating with the strap portions to dampen frequency response in the main beam portion.

11. The passenger compartment of claim 10 wherein the main beam portion has first, second, third and fourth sections;

the first section of the main beam portion extending from the driver side pillar to a location from which a first strap portion extends;

the second section extending between the first strap portion and a second strap portion, the second portion having flanges thereon for supporting a steering column projecting into the passenger compartment;

the third section extending from the second strap portion to a third strap portion, the third section having an opening for receiving an HVAC module therethrough for access to and from the passenger compartment with the vertical strut portions extending downwardly therefrom, and the fourth section extending from the third strap portion to the second end of the main beam portion, the fourth section adapted to accommodate a passenger air bag mounting bracket thereabove and the instrument panel trim therebelow.

12. The passenger compartment of claim 11 wherein the main beam portion has a front side adapted to face forward away from the passenger cabin and a rear side adapted to face rearwardly into the passenger compartment, the front side having an array of cast cross braces within a cavity in the front side.

* * * * *